United States Patent
Camras et al.

(10) Patent No.: US 11,798,406 B2
(45) Date of Patent: *Oct. 24, 2023

(54) ROAD LIGHTING

(71) Applicant: Lumileds LLC, San Jose, CA (US)

(72) Inventors: Michael Camras, San Jose, CA (US); Jyoti Kiron Bhardwaj, Cupertino, CA (US)

(73) Assignee: Lumileds LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/084,373

(22) Filed: Dec. 19, 2022

(65) Prior Publication Data
US 2023/0121234 A1    Apr. 20, 2023

Related U.S. Application Data

(63) Continuation of application No. 17/991,364, filed on Nov. 21, 2022, which is a continuation of application
(Continued)

(30) Foreign Application Priority Data

Mar. 21, 2018   (EP) .................................. 18163162

(51) Int. Cl.
*G08G 1/005*       (2006.01)
*H05B 47/115*    (2020.01)
(Continued)

(52) U.S. Cl.
CPC ............. *G08G 1/005* (2013.01); *B60Q 1/525* (2013.01); *G08G 1/166* (2013.01); *H05B 47/115* (2020.01); *H05B 47/125* (2020.01); *F21S 8/088* (2013.01)

(58) Field of Classification Search
CPC ................ B60Q 2300/42; F21K 9/232; F21W 2102/00; F21W 2111/023;
(Continued)

(56) References Cited

U.S. PATENT DOCUMENTS 6,592,245 B1    7/2003  Tribelsky et al.
7,791,458 B2    9/2010  Shimaoka et al.
(Continued)

FOREIGN PATENT DOCUMENTS

CN       201311671 Y    9/2009
CN       102413603 A    4/2012
(Continued)

OTHER PUBLICATIONS

Abedi et al., "Assessment of Antenna Characteristic Effects on Pedestrian and Cyclists Travel-time Estimation based on Bluetooth and WiFi MAC Addresses", (2015), 32 pages.
(Continued)

*Primary Examiner* — Omeed Alizada

(57) ABSTRACT

Systems, devices, and methods are disclosed in which one or more light sources, a detector, a processor and a controller are configured such that light from the one or more light sources improves the ability of a human or automated motor vehicle driver to identify and avoid pedestrians. The one or more light sources may provide spot illumination to moving objects or pedestrians on a road surface, with the spot illumination following the moving object or pedestrians along the portion of the road surface. The one or more light sources may project images on the ground or on other surfaces. The light source may be carried by a pedestrian or on personal transport used by a pedestrian. The light sources may be stationary and provide lighting for a pedestrian street crossing.

20 Claims, 11 Drawing Sheets

Related U.S. Application Data

No. 17/407,019, filed on Aug. 19, 2021, now Pat. No. 11,508,235, which is a continuation of application No. 16/228,516, filed on Dec. 20, 2018, now Pat. No. 11,107,346.

(51) Int. Cl.
*H05B 47/125* (2020.01)
*B60Q 1/50* (2006.01)
*G08G 1/16* (2006.01)
*F21S 8/08* (2006.01)

(58) Field of Classification Search
CPC ....... F21W 2111/027; F21W 2131/103; F21W 2131/40; F21Y 2115/10
See application file for complete search history.

(56) References Cited

U.S. PATENT DOCUMENTS

| | | | |
|---|---|---|---|
| 8,651,714 | B1 | 2/2014 | Hamasaki |
| 9,057,926 | B1* | 6/2015 | Brown .................. G02F 1/3137 |
| 9,163,825 | B2 | 10/2015 | Kim |
| 9,168,867 | B2 | 10/2015 | Tamatsu et al. |
| 9,392,674 | B2 | 7/2016 | Lin et al. |
| 9,607,496 | B2 | 3/2017 | Beggs et al. |
| 9,679,482 | B2 | 6/2017 | Werner et al. |
| 9,763,306 | B2 | 9/2017 | Sachs et al. |
| 9,848,473 | B1 | 12/2017 | Jin et al. |
| 9,963,153 | B2 | 5/2018 | An et al. |
| 10,885,772 | B2 | 1/2021 | Camras et al. |
| 10,957,187 | B2 | 3/2021 | Camras et al. |
| 11,107,346 | B2 | 8/2021 | Camras et al. |
| 11,508,235 | B2 | 11/2022 | Camras et al. |
| 2011/0074313 | A1 | 3/2011 | Gordin |
| 2012/0074842 | A1 | 3/2012 | Hattori et al. |
| 2012/0206050 | A1 | 8/2012 | Spero |
| 2012/0214171 | A1* | 8/2012 | Kotseroglou ........ C12Q 1/6869 435/6.15 |
| 2012/0229028 | A1 | 9/2012 | Ackermann |
| 2013/0013091 | A1 | 1/2013 | Cavalcanti et al. |
| 2014/0029281 | A1 | 1/2014 | Suckling et al. |
| 2015/0145698 | A1 | 5/2015 | Werner et al. |
| 2015/0362165 | A1* | 12/2015 | Chu .................. H01L 33/32 362/235 |
| 2016/0090023 | A1 | 3/2016 | Asaoka |
| 2017/0038018 | A1* | 2/2017 | Johnson .................. F21V 21/14 |
| 2017/0182934 | A1 | 6/2017 | Arita et al. |
| 2018/0182111 | A1 | 6/2018 | Shinohara et al. |
| 2018/0257548 | A1 | 9/2018 | Suzuki et al. |
| 2018/0262865 | A1 | 9/2018 | Lepp et al. |

FOREIGN PATENT DOCUMENTS

| | | | |
|---|---|---|---|
| CN | 102797998 | A | 11/2012 |
| CN | 102798065 | A | 11/2012 |
| CN | 103770733 | A | 5/2014 |
| CN | 103993563 | A | 8/2014 |
| CN | 104822196 | A | 8/2015 |
| CN | 204623641 | U | 9/2015 |
| CN | 105467935 | A | 4/2016 |
| CN | 105889882 | A | 8/2016 |
| CN | 205844717 | U | 12/2016 |
| CN | 205919225 | U | 2/2017 |
| CN | 106594581 | A | 4/2017 |
| CN | 106900108 | A | 6/2017 |
| CN | 107139836 | A | 9/2017 |
| DE | 102012206691 | A1 | 10/2013 |
| DE | 102015225410 | A1 | 6/2017 |
| EP | 2896875 | A1 | 7/2015 |
| JP | 2008143510 | A | 6/2008 |
| JP | 2011175560 | A | 9/2011 |
| JP | 2014046838 | A | 3/2014 |
| JP | 2016090318 | A | 5/2016 |
| KR | 20100108085 | A | 10/2010 |
| KR | 101728080 | B1 | 4/2017 |
| TW | 201220952 | A | 5/2012 |
| TW | 201440575 | A | 10/2014 |
| TW | 2015424266 | A | 6/2015 |
| TW | 201531164 | A | 8/2015 |
| TW | 201634860 | A | 10/2016 |
| WO | 2014007452 | A1 | 1/2014 |
| WO | 2014/109885 | A2 | 7/2014 |
| WO | 2014/109885 | A3 | 7/2014 |

OTHER PUBLICATIONS

The extended European Search Report corresponding to EP18163162. 3, dated Sep. 21, 2018, 8 pages.
From the EPO as the ISA, the International Search Report and Written Opinion corresponding to PCT/us2018/067132, dated Jun. 13, 2019, 21 pages.
Communication relating to the Results of the Partial International Search PCT/US2018/067132.
Baleja et al., "Increasing of Visibility on the Pedestrian Crossing by the Additional Lighting Systems", IOP Conference Series: Materials Science and Engineering, Sep. 1, 2017, 8 pages.
S. Fotios, et al., "Road Lighting Research for Drivers and Pedestrians: The basis of Luminance and Illuminance Recommendations", Lighting Research & Technology, vol. 50, No. 1, Jan. 1, 2018, 33 pages.
John D. Bullough, et al., "Design and Evaluation of Effective Crosswalk Illumination", Final Report, NJDOT, Report No. FHWA-NJDOT-2009-003, Mar. 2009, 60 pages.
Nazhat Aboobaker, et al., "Design and Evaluation of Effective Crosswalk Illumination", FHWA-NJ-2009-003, Mar. 2009, 3 pages.
International Search Report, PCT/US2018/067132, dated Jun. 13, 2019, 7 pages.
Written Opinion of the ISA, PCT/US2018/067132, dated Jun. 13, 2019, 14 pages.
U.S. Appl. No. 16/228,514, filed Dec. 20, 2018, 38 pages.
U.S. Appl. No. 16/228,516, filed Dec. 20, 2018, 36 pages.
U.S. Appl. No. 16/228,506, filed Dec. 20, 2018, 38 pages.
Blaha et al., "Solution of lighting for pedestrian crossing to increase their visibility", Proceedings of the 2014 IEEE 15th International Scientific Conference on Electrical Power Engineering (EPE), 4 pages.
Cellucci et al., "Lighting Distribution affects Pedestrians' Sense of Security", 2016 IEEE 16th International Conference on Environment and Electrical Engineering (EEEIC), 5 pages.
Baleja et al., "Measurement of luminance ratios at pedestrian crossing", 2015 IEEE 15th International Conference on Environment and Electrical Engineering (EEIC), 5 pages.
Camras et al., U.S. Appl. No. 17/991,364, filed Nov. 21, 2022, 36 pages.
Camras et al., U.S. Appl. No. 18/084,369, filed Dec. 19, 2022, 37 pages.

* cited by examiner

ROAD LIGHTING

CROSS REFERENCE TO RELATED APPLICATIONS

This application is a continuation of U.S. application Ser. No. 17/991,364 filed on Nov. 21, 2022, which claims priority to U.S. application Ser. No. 17/407,019 filed on Aug. 19, 2021 (now U.S. Pat. No. 11,508,235), which claims priority to U.S. application Ser. No. 16/228,516 filed on Dec. 20, 2018 (now U.S. Pat. No. 11,107,346), which claims priority to U.S. Provisional Patent Application 62/608,963 filed on Dec. 21, 2017, and to European Patent Application No. 18163162.3 filed on Mar. 21, 2018. All of the above-listed applications are incorporated by reference herein in their entirety.

FIELD OF THE INVENTION

The invention relates generally to lighting, and in particular to road lighting.

BACKGROUND

A human vehicle driver or an automated motor vehicle driver approaching an intersection or other road crossing must identify and avoid pedestrians and cyclists or others on personal transport (all collectively referred to herein as "pedestrians") that are in or entering the path of the vehicle. Typically this is facilitated by use of designated cross-walks with built in signaling and illumination lamps, yet even in these cases in various road and lighting conditions a driver may have difficulty identifying a pedestrian or cyclist in time to avoid an accident. Additionally, pedestrians and cyclists frequently cross roadways, or travel along the side of roadways, where no such apparatus exist.

The definition of a motor vehicle is defined in the U.S. Code of Federal Regulations by 40 CFR 85.1703: (a) For the purpose of determining the applicability of section 216(2), a vehicle which is self-propelled and capable of transporting a person or persons or any material or any permanently or temporarily affixed apparatus shall be deemed a motor vehicle, unless any one or more of the criteria set forth below are met, in which case the vehicle shall be deemed not a motor vehicle: (1) The vehicle cannot exceed a maximum speed of 25 miles per hour over level, paved surfaces; or (2) The vehicle lacks features customarily associated with safe and practical street or highway use, such features including, but not being limited to, a reverse gear (except in the case of motorcycles), a differential, or safety features required by state and/or federal law; or (3) The vehicle exhibits features which render its use on a street or highway unsafe, impractical, or highly unlikely, such features including, but not being limited to, tracked road contact means, an inordinate size, or features ordinarily associated with military combat or tactical vehicles such as armor and/or weaponry. (b) [Reserved] [39 FR 32611, Sep. 10, 1974, as amended at 45 FR 13733, Mar. 3, 1980; 73 FR 59178, Oct. 8, 2008; 75 FR 22977, Apr. 30, 2010].

This specification follows this definition of a motor vehicle, so a non-motor vehicle would include such apparatuses or instruments of conveyance as a unicycle, bicycle, tricycle, scooter, skates, and the like. This specification designates these non-motor vehicles as personal transport even though they may transport more than one person, for example a bicycle or scooter may be capable of accommodating more than one person. These personal transport may also be self-propelled as long as its maximum speed on a level paved surface is 25 mph or less. This personal transport would include motorized scooters, for example a Segway, or motorized skates.

SUMMARY

This specification discloses systems, devices, and methods in which one or more light sources, a detector, a processor and a controller are configured such that light from the one or more light sources improves the ability of a human or automated motor vehicle driver to identify and avoid pedestrians. The one or more light sources may provide spot illumination to moving objects (for example, pedestrians) on a road surface, with the spot illumination following the moving object or pedestrians along the portion of the road surface. The one or more light sources may project images on the ground or on other surfaces. The one or more light sources may be carried by a pedestrian or on personal transport used by a pedestrian. The one or more light sources may be stationary and provide lighting for a pedestrian street crossing.

These and other embodiments, features and advantages of the present invention will become more apparent to those skilled in the art when taken with reference to the following more detailed description of the invention in conjunction with the accompanying drawings that are first briefly described.

DETAILED DESCRIPTION

Figure 1:
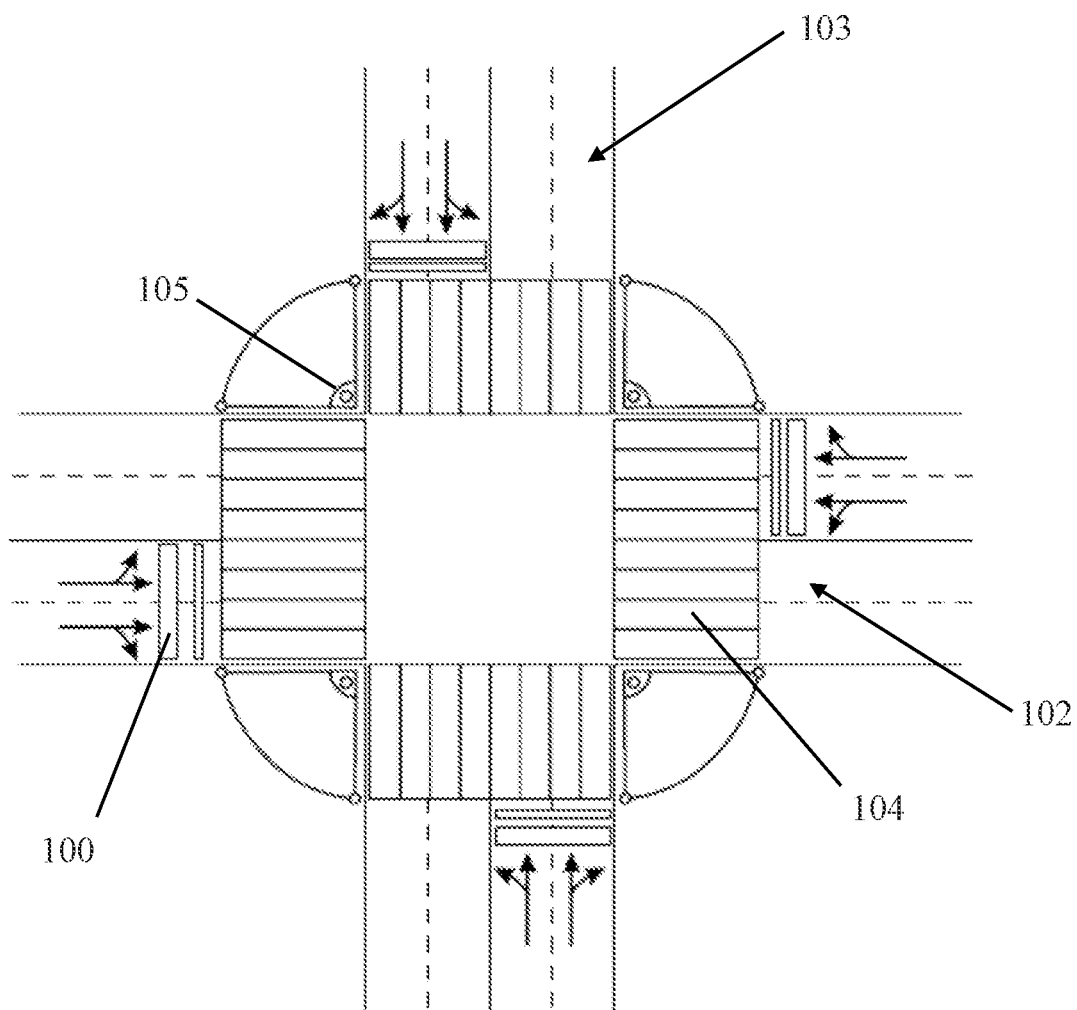
FIG. 1 schematically illustrates a plan view of an intersection of two roads at which is deployed an example embodiment of a road lighting system as described herein.

The following detailed description should be read with reference to the drawings, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention.

Illumination and/or projection devices (light sources) used in the systems, devices, and methods described herein may be or comprise an LED array or laser system. An LED and laser device is discussed in U.S. patent application Ser. No. 15/802,273 by the same assignee, which is hereby incorporated herein by reference in its entirety. A pixelated LED array, including a microLED array and laser pumped array are described in this reference. Such LED arrays are also described further, below, with reference to FIG. 8A-FIG. 12.

One of the visual tasks of a motor vehicle driver when approaching a crossing is that a pedestrian is revealed on the road surface by silhouette vision, the assumption being that the lit road surface allows a person to be seen in negative contrast as a 'shadow'. This, however, is an over-simplification of what really occurs. In practice car headlights provide competing positive contrast, which can at the point of transition (zero contrast) make a person appear almost invisible. For this reason additional local lighting is needed to ensure positive contrast.

The additional lighting must alert drivers to the presence of the crossing and make pedestrians as visible as possible on and at the crossing area. Zones at either end of the crossing, where pedestrians wait to enter, should receive adequate illumination. When measured on a vertical plane, the lighting should be significantly higher than the horizontal illuminance produced by road lighting on the roadway. It should also prevent glare from reaching the approaching driver. One solution is to use luminaires with asymmetric light output, positioned a short distance before the crossing in the direction of approaching traffic, directing the light onto the side of pedestrians facing the drivers of this traffic.

In addition to designated crosswalks with built in signaling and illumination lamps, there is oftentimes a need for pedestrians to cross roadways where no such apparatus have been built in. Additionally, for pedestrians forced to walk along a roadway where no sidewalks are available and for bicycles riding along a roadside without a bicycle lane designation proper illumination is essential at night to avoid collisions.

New innovations in automotive lighting implementing adaptive lighting using LED matrix and laser systems may employ a camera that can detect poorly lit objects such as pedestrians and animals and direct a beam of light at these objects before the driver would even perceive them. However, until such systems become low enough in cost to be fitted to a majority of vehicles and until such a time when the number of these vehicles on the road become dominant there is a need to provide pedestrian safety to all, no matter what vehicle is driven.

The US Department of Transportation Federal Highway Administration publication number FHWA-HRT-08-053 titled "Informational Report on Lighting Design for Midblock Crosswalks" contains some basic concepts of crosswalk illumination. Illuminance (E) is the amount of light that falls on an area of a surface and can be measured in units of lux (lx) and is the same as lumens/m² (lm/m²). The illuminance on a plane normal to the direction of propagation of light, such as the surface of a street, is equal to the luminous intensity (I) divided by the square of the distance (D). The distance D is the mounting height (h) of the light source divided by the sine of the angle between a line from the measurement point on the horizontal street surface to the light source and the vertical:

$E=I/D^2=I/(h/\sin \Phi)^2$ and for the point on the street directly beneath the light source ($\Phi=90°$), then $E=I/h^2$.

For a pedestrian walking across the street, the illuminance on the pedestrian is the illuminance E multiplied by the cosine of the angle between the direction of propagation of light to the pedestrian and plane normal. This is the vertical illuminance $E_{vert}$ and is the illuminance on a vertical surface, such as a pedestrian. If the height of the pedestrian is $h_p$, then the vertical illuminance on the pedestrian is:

$E_{vert}=I \cos \Phi/D^2=(I \cos \Phi)/((h-h_p)/\sin \Phi)^2=I \cos \Phi \sin^2\Phi/(h-h_p)^2$.

Luminance (L) is the light emitted, transmitted, or reflected from a surface in a specific direction per unit area and can be measured in Cd/m² or nit. A candela is the same as a lumen/steradian (lm/sr). In the case of the pedestrian on the street, an observer in a vehicle would perceive the luminance of the (vertical) illuminance reflected off the pedestrian. This is related to how bright the pedestrian appears when viewed from a specific direction, however the appearance of the surroundings and the observer's eye adaptation level with the object luminance also come into play. Luminance and contrast are both used in calculating the appearance of an object or pedestrian in this case.

Light on a surface is either reflected, absorbed, and/or transmitted. For the pedestrian, we are mainly concerned with reflected light. There are various types of reflected light such as specular and diffuse. Specular such as a reflection from a mirror or mirror like surface is reflected at an opposite angle of incidence and with an intensity nearly equal to the incident ray. For a diffuse reflecting surface, light is scattered and reflected in all directions and this is the case for the pedestrian, where clothing is mostly a diffuse reflector. The luminance of a perfectly diffuse reflector is:

$L=RE/\pi$, where R is the reflectance, E is the illuminance, and π is pi steradians.

Contrast is the visual difference between an object such as a pedestrian and its background and is often expressed as:

$$C=(L_p-L_{background})/L_{background}.$$

Contrast can be positive or negative and can range from very large positive numbers when the background luminance is very low to something close to −1 when the object luminance is very low.

For the pedestrian in this case, $$C=((R_p E_{vert}/\pi)-L_{background})/L_{background}.$$

The only variable that can be controlled is the vertical illuminance on the pedestrian from the crossing light source, lamp, or luminaire. The background luminance is determined by the surroundings and can be very low in a rural setting or very bright in a city street setting with many well-lit retail stores. The reflectivity of the pedestrian $R_p$ is largely determined by the pedestrians clothing. Choosing white clothing dramatically increases visibility over a wide range of illumination levels, whereas denim clothing visibility is greatly impacted by illumination level. Reflective clothing worn at night can dramatically improve the safety of the pedestrian.

Bright road surfaces or bright lighting from shops and stores increase the background luminance and reduce contrast that make it more difficult to discern pedestrians. To compensate for a higher background luminance $L_{background}$, vertical illuminance $E_{vert}$ must be increased for a driver to clearly see a pedestrian in the crosswalk. Whether the contrast of the pedestrian is positive or negative (contrast polarity) and the uniformity of the contrast across the pedestrian (contrast variance) are two other important issues in determining the visibility of a pedestrian crossing or walking along a road.

Both contrast polarity and variance will change as a function of distance the vehicle driver is from the pedestrian. At distances greater than 300 feet, the background luminance is typically higher than that of the pedestrian. At distances less than 100 feet, the low beam headlamps of the vehicle provide enough vertical illuminance that the luminance of the pedestrian is higher than the background and contrast is positive. At a distance in between 300 and 100 feet, the contrast polarity flips from negative to positive and the pedestrian is not visible during this transition. Lighting systems must insure that the pedestrian becomes visible at distances that provide adequate time for the driver to respond and the vehicle to stop.

In actuality, the contrast of a pedestrian is not uniform. The feet and lower legs of a pedestrian may be in negative contrast against a lit road surface and the rest of the pedestrian may be in positive contrast against a darker background. With conventional lighting systems it is difficult to maintain a given level of negative contrast and so is considered good practice for a lighting system to provide sufficient positive contrast to detect pedestrians at a distance long enough for a vehicle driver to respond and stop. Depending on background luminance a vertical illuminance $E_{vert}$ of at least 10, 20, or 30 lx is needed to provide adequate pedestrian visibility.

Glare is another consideration in designing a crosswalk illumination system. Glare can be from an opposing vehicle's headlamps approaching between the observer and the crosswalk or from a wet road surface reflecting light towards the observer. Glare happens when luminance is much higher than the luminance to which the observer's eyes are adapted to. Discomfort glare occurs when the observer experiences discomfort or pain when viewing the light source, but disability glare limits or prevents the observer from performing a visual task, such as detecting a pedestrian. Road and crosswalk lighting are installed to mitigate disability glare. Detectors or sensors in the road lighting system can check for these glare conditions with on oncoming traffic and road reflectivity.

An object such as a pedestrian has a threshold contrast $C_{Threshold}$ at which the object may just be detected that is a probability of detection of 50% and depends on such things as visual angle α of the object that is related to object size, length of observation time $t_{observe}$, the adaption luminance $L_{adaption}$ of the observer, and the age of the observer. For pedestrian safety, lighting conditions must provide an actual contrast $C_{Actual}$ that is greater than threshold contrast $C_{Threshold}$.

The visibility level VL is defined as the ratio of the actual contrast to the threshold contrast:

$$VL=C_{Actual}/C_{Threshold}=C_{Actual}/C_{Threshold}(\alpha, t_{observe}, L_{adaption}, age)$$

The higher the VL, the greater the chances that the pedestrian is seen. VL provides a measure of the performance of a lighting installation.

FIG. 1 schematically illustrates a plan view of an intersection of two roads 102 and 103. Embodiments of this invention include light sources 100 that can be positioned above (and optionally in front of) a crosswalk 104 for vertical illumination to provide illuminance $E_{horiz}$, and one or more light sources 105 that can be positioned near one or both ends of the crosswalk, for example, to provide $E_{vert}$ components and/or light sources to provide more of a horizontal illuminance with $E_{vert}$ and $E_{horiz}$ components. These light sources may also project images as described below. Light sources 100 and 105 may be or comprise LED and laser light sources.

Figure 2:
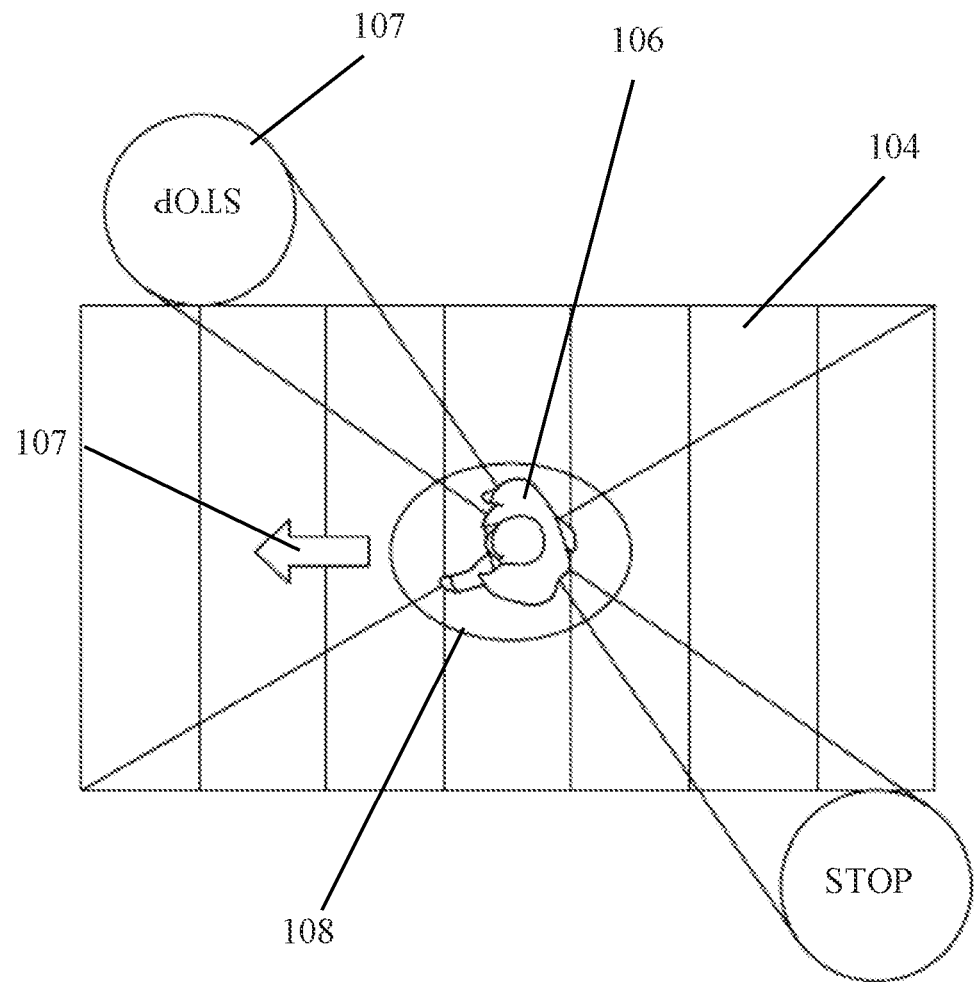
FIG. 2 schematically illustrates a plan view of a pedestrian in a cross walk using another example embodiment of a road lighting system as described herein.

Additionally, or alternatively, a light source or light sources can be carried by pedestrian 106 in the form of a handheld device as shown in FIG. 2. The light source or sources may be for example a mobile phone or other pocket size device and/or may be worn on the pedestrian, for example on a belt or clipped on to a pocket, or worn over the shoulder, or around a neck or on bicycle such a on the handlebar, below the seat, on the peddles, wheels or spokes.

The light sources (portable or stationary) can provide $E_{vert}$ illuminance on the pedestrian, and/or project an image 107 such as a crosswalk, stop, yield, or caution sign on the pavement or in a vertical location noticeable to the driver (but not for example where it would dazzle or blind a vehicle driver) such as where such a caution, yield, or stop sign may be traditionally placed. Such display images and text may be projected on both sides of the road where there is traffic from both directions. An image 107 presenting the text "stop" may have an octagonal shape on the road, for example.

Such lighting and projection devices can be used on conventional crosswalks where additional lighting and warnings are desired as well as where a designated crosswalk is not available but a crossing must be made. The designated crosswalks may incorporate this technology in mounted devices that also provide $E_{vert}$ and $E_{horiz}$ illumination, can project the crosswalk image, and can project a circle or other shape around the pedestrian that follows the pedestrian(s) all the way across the street. The projection may also include an arrow indicating the direction of movement of the pedestrian. A spot light may be used instead of or in combination with this lighting that may also follow the pedestrian across the street.

Figure 3:
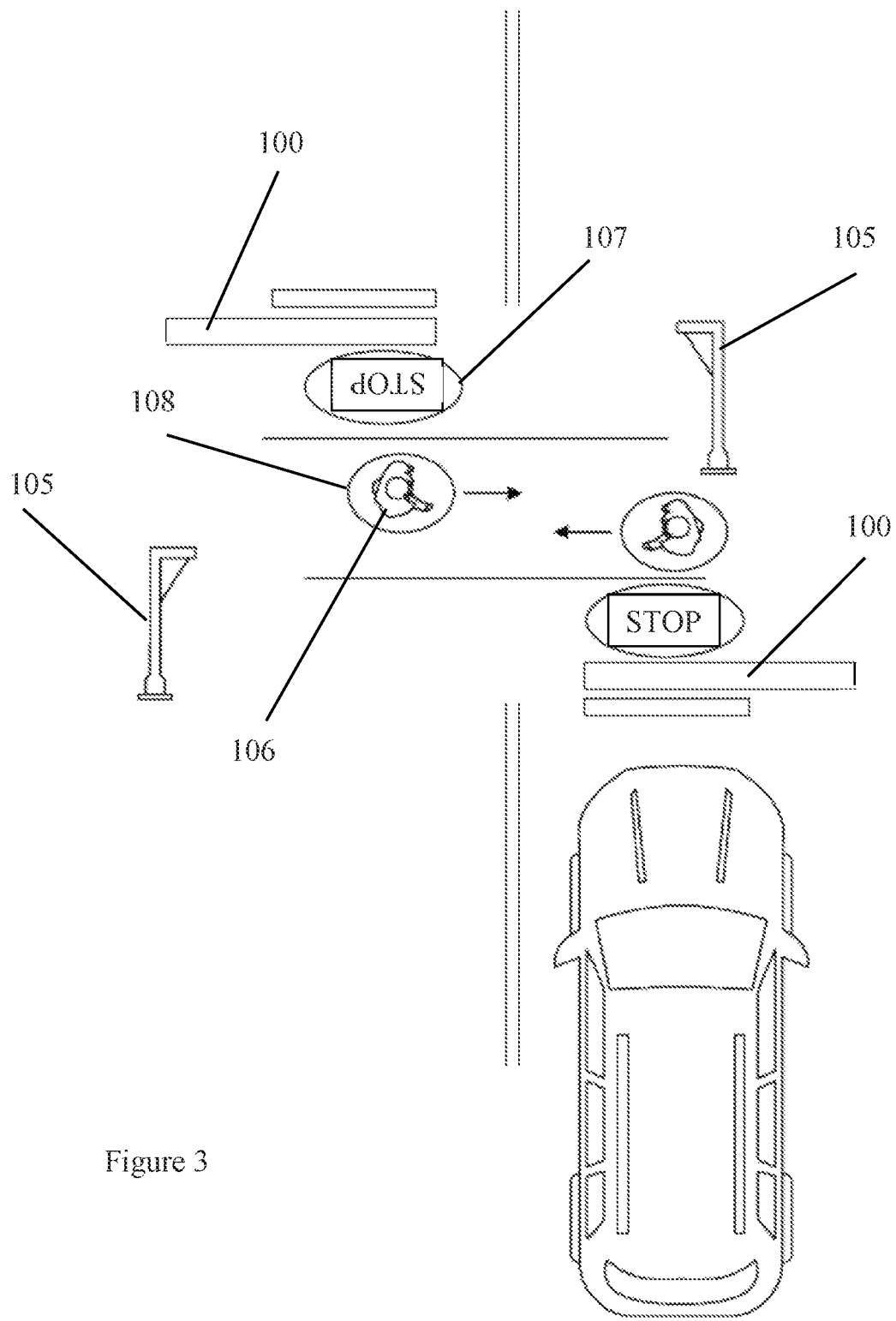
FIG. 3 schematically illustrates another plan view of an intersection of two roads at which is deployed an example embodiment of a road lighting system as described herein, with some lighting components shown in side view rather than plan view.

These projections can include images and text on the pavement or above in locations readily visible to vehicle drivers in all relevant directions of travel, without dazzle, glare, or blinding and can be multicolor, such as white, red, yellow, green, and blue (FIG. 2 and FIG. 3). Such mounted and mobile lighting systems may be used not only for crossing streets, but by pedestrians and bicycle riders as they walk or ride along the edges of street. These devices can also be used on pedestrian or sidewalks that have little or no lighting.

Figure 4:
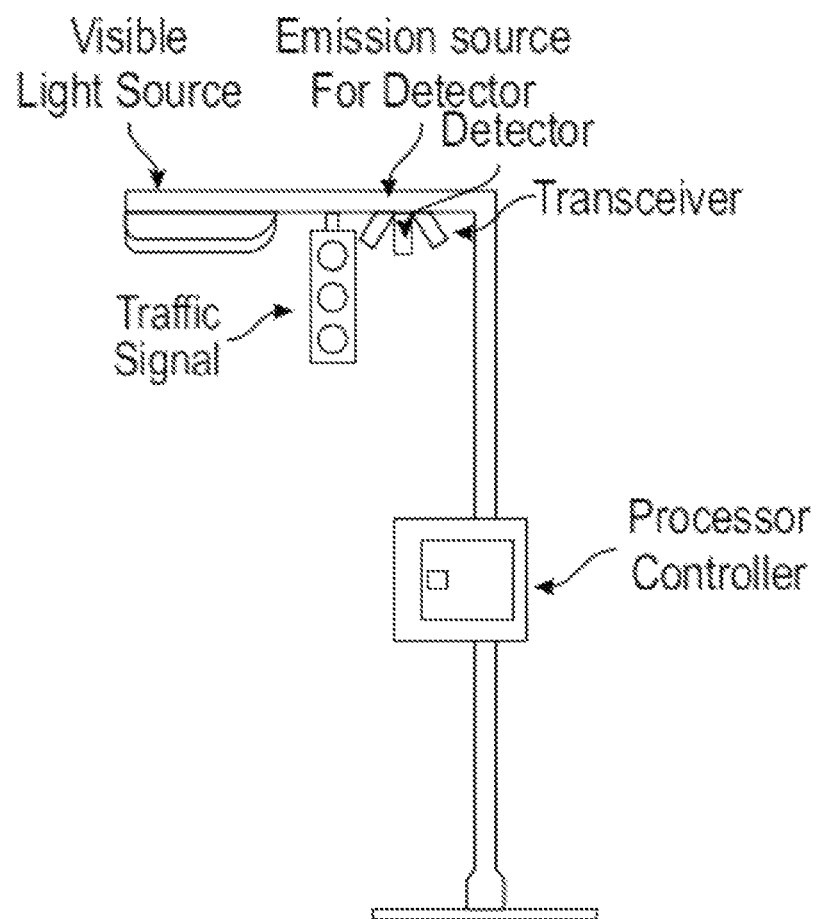
FIG. 4 schematically illustrates an arrangement of components used in an example road lighting system as described herein.

These illumination systems, as shown in FIG. 4 for example, can employ one or more detectors, sensors, or cameras that may function in the IR, ultrasonic, radar, and/or LiDAR range. Controllers and processors can take the detector, sensor, and/or camera output signals as input to output lighting control to the light source(s) and control the lighting of pixel elements in the matrix array by controlling which CMOS transistors are turned on and off, or controlling the laser beam rastering of color converting elements or pixels via a MEMS based mirror array or an acousto-optic reflector or deflector, for example. The road lighting system may be activated manually be a pedestrian, for example by pushing a button (not shown) on the light source support pole in FIG. 4. The road lighting system may alternatively be activated by a pedestrian sending a signal from a mobile device, or may automatically activate upon detecting the presence of a pedestrian.

Also or in addition vehicle to vehicle, infrastructure, pedestrian, target, or object (V2X) communications may be used to provide position, speed, vehicle type and dimensions, etc. to adaptive front, rear, and side exterior lighting systems. GPS communications may additionally be used. Imaging processors can take the input of a camera, IR sensors, LiDAR, radar, ultrasound receivers and such, to map out an image of the traffic and pedestrian situation that can include location, speed, direction, etc. and send to a controller that can be optionally integrated with the processor a signal to control one or more lighting fixtures, light projections of warning images such as traffic type signs that can be multicolor and include text, as well as crosswalk projections, and pedestrian highlight, and communications to the vehicles and pedestrians.

For example, a spot light can illuminate a pedestrian and multiple spot lighting providing ample illuminance in the vertical plane $E_{vert}$ (horizontal light on the pedestrian) can be used for each pedestrian in the crossing that can emanate from a single light source such as an array or multiple light sources spatially separated can be used. The spot illumination need not be circular in shape and may be any shape that illuminates the pedestrian(s) and can follow the pedestrian(s) in real time. This spot illumination can be provided by light rays traveling in a direction horizontal to the pavement and normal to the vertical plane of the pedestrian and increase the vertical illuminance $E_{vert}$.

Some extra spot illumination may be provided to the pavement area $E_{horiz}$ surrounding the pedestrians, enough to get attention of the vehicle driver, but not enough to significantly decrease the pedestrian contrast. The horizontal illuminance can also follow the pedestrian(s) in real time can be any shape including for instance a rectangular section of the crossing that follows the pedestrian(s) movement. This $E_{horiz}$ illuminance can be in the form of a projection, where the area surrounding the pedestrian can be highlighted with a projection on or above the pavement, for example a partial or full circular-oval or square-rectangular type shape in white and red for example and a green arrow can be projected indicating the direction of movement.

The horizontal illumination that is not part of the projection can be suppressed in an area around the pedestrian and the projection to maximize contrast, this suppressed or dark spot of horizontal illumination $E_{horiz}$ can also follow the pedestrian.

Projections of traffic signs images that can include text and color can be projected on the ground (FIG. 2 and FIG. 3) or above or on prelocated mounted screens that can be diffuse reflective or translucent to transmit with some scattering the projection to the opposite side that receives the projected image for viewing by the oncoming vehicles.

Instead of or in addition to stationary signs, displays can be used that can be programmed to change color and display a warning that is triggered when a pedestrian enters the street, this can be accomplished with one of the existing detectors and switched by the lighting controller or separate units can be used. The detector can also be determine the condition of the roadway, such as reflectivity, from rain and snow for example and adjust the projection accordingly for better visibility and location to allow for increased stopping distances. In addition or alternately, weather information may be received from an internet or Ethernet communication. The processor and/or controller may be connected to a network or the Ethernet that may communicate to the oncoming vehicle a visual and/or audible warning. This can be a visual warning on a dashboard display, heads-up display (HUD), or simply a warning light. The audible warning can also be from the dash display or HUD or can activate the radio speaker. Alternatively, a mobile phone or navigation device in the vehicle can be used to sound and/or display a warning. Likewise a warning can be communicated to a pedestrian via a mobile phone or other handheld lighting and/or communication device. The pedestrian's communications device may also be to communicate with the lighting system of the crosswalk to initiate a lighted crossing and receive instructions from the system on when to enter the crosswalk for example.

An emissions source such as an infrared (IR) light source, for example a VCSEL or LED array can be used with a detector such as a camera to detect pedestrians. The camera and light source may be mounted in or integrated with one or more of the visible light sources 100 or 105 as shown in FIG. 4, for example, or may be mounted separately.

Figure 5:
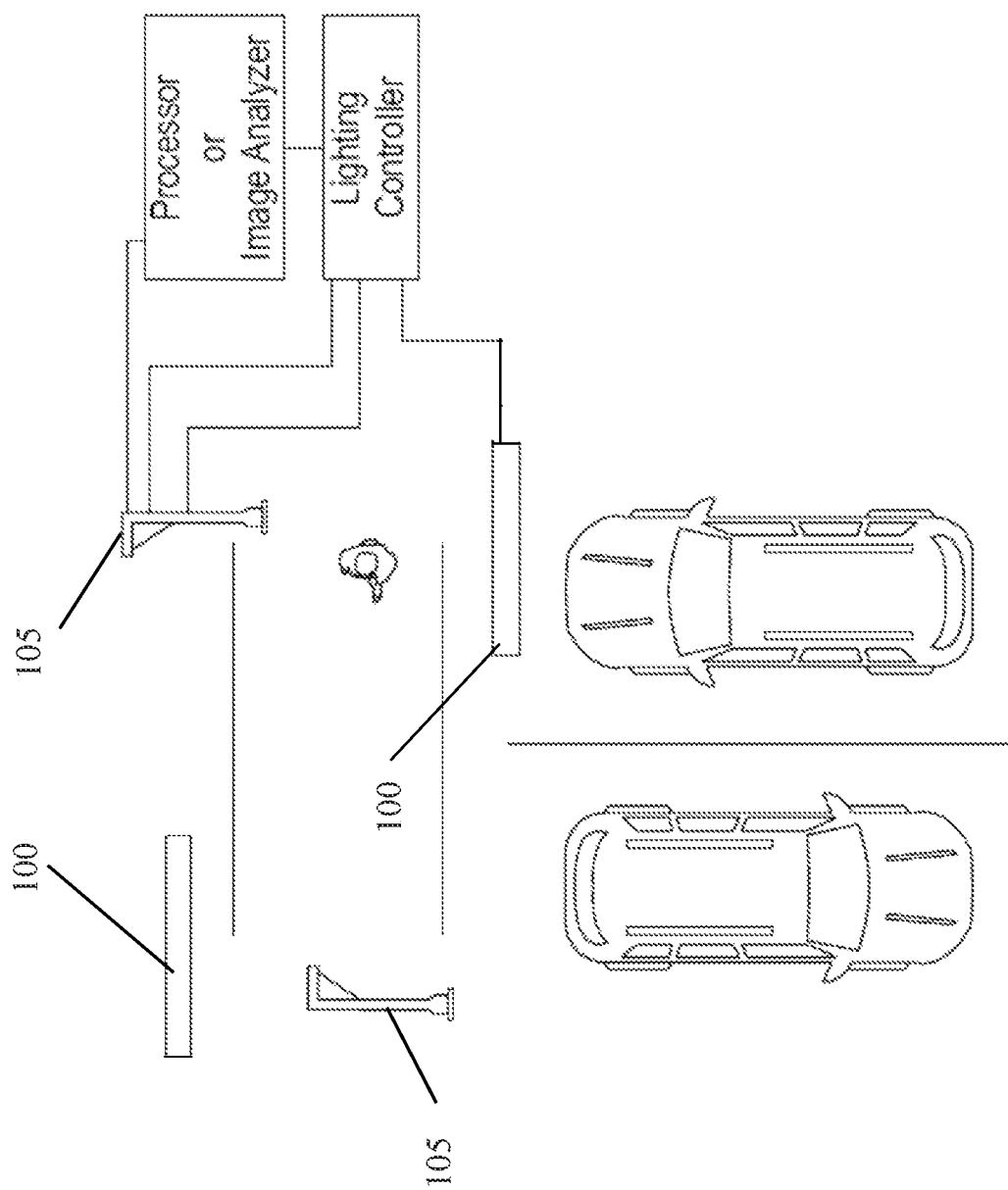
FIG. 5 schematically illustrates another plan view of an intersection of two roads at which is deployed an example embodiment of a road lighting system as described herein, with some lighting components shown in side view rather than plan view, and with a block diagram superimposed showing processing and control components of the system.

As shown generally in FIG. 5, signals from the camera (detector) may be processed by a processor or image analyzer and used by a lighting controller to control light sources 100 and 105 to perform as described above. In this figure, the line schematically linking the processor or image analyzer to light source 105 indicates communication with a camera (detector) co-located with light source 105. Similarly, one of the lines schematically linking the lighting controller to light source 105 indicates communication with an emission source used in combination with the camera (detector) co-located with light source 105.

Figure 6:
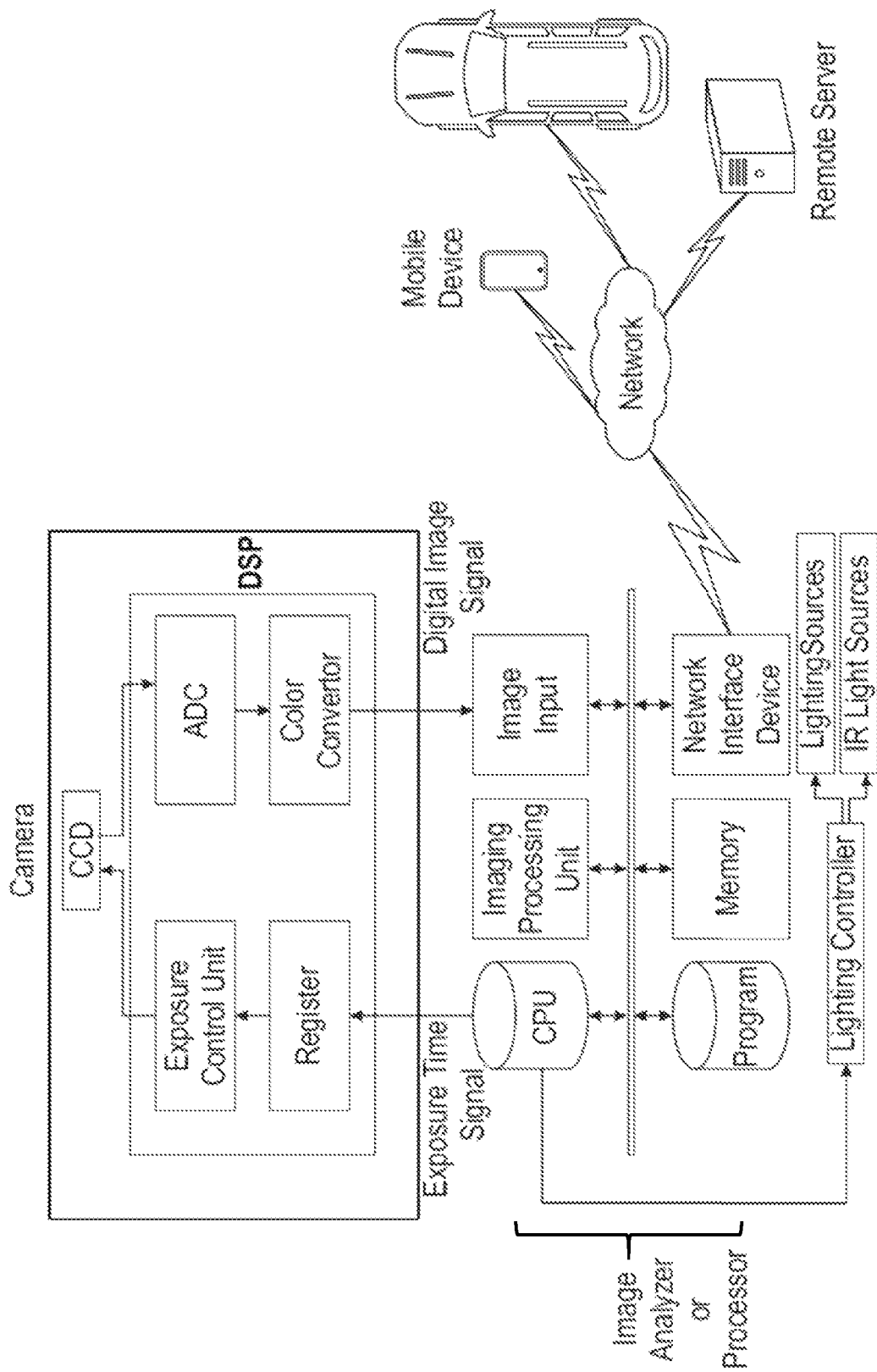
FIG. 6 is a block diagram of an example embodiment of a road lighting system as described herein, showing the system's optional interconnection to a mobile device and/or an automobile through a network.

Optionally, the camera can also detect the higher intensity white headlight beams of an oncoming vehicle as well as the lower intensity red taillights of a passing vehicle. The camera may comprise a CCD and digital signal processor (DSP) that communicate with each other as shown in FIG. 6, for example. The DSP may also communicate with the processor or an image analysis unit that can have an image input to which the DSP connects, an imaging processing unit, a CPU that can send an exposure signal back to the camera DSP, program, and memory. The camera DSP may further comprise an analog digital converter (ADC) that receives a CCD input, a color converter unit that outputs a digital image signal to the image input of the imaging processing unit, an exposure control unit that outputs a signal to the CCD, a register that receives an exposure signal from the CPU of the image processing unit and outputs signals to the exposure control unit and the color converter unit. The CPU of the image analysis unit or processor can output a signal to a controller of the light sources.

Based on the processor output, the controller can turn on and off various light sources and control the beam pattern from each of the individual light sources. Optionally the CPU of the image analysis unit or processor can also output a signal to a control unit of the IR light source, or the controller can operate and control all the light sources including the visible and IR.

This illustrates one embodiment and instead of or in addition to a camera and IR source, ultrasonic, LiDAR, radar, heat sensors that may detect IR, or pressure sensitive pads that can be installed below ground with appropriate sensors or detectors may be used along with optional supplemental sources used to generate the radiation or signal of the source to be detected.

Figure 7:
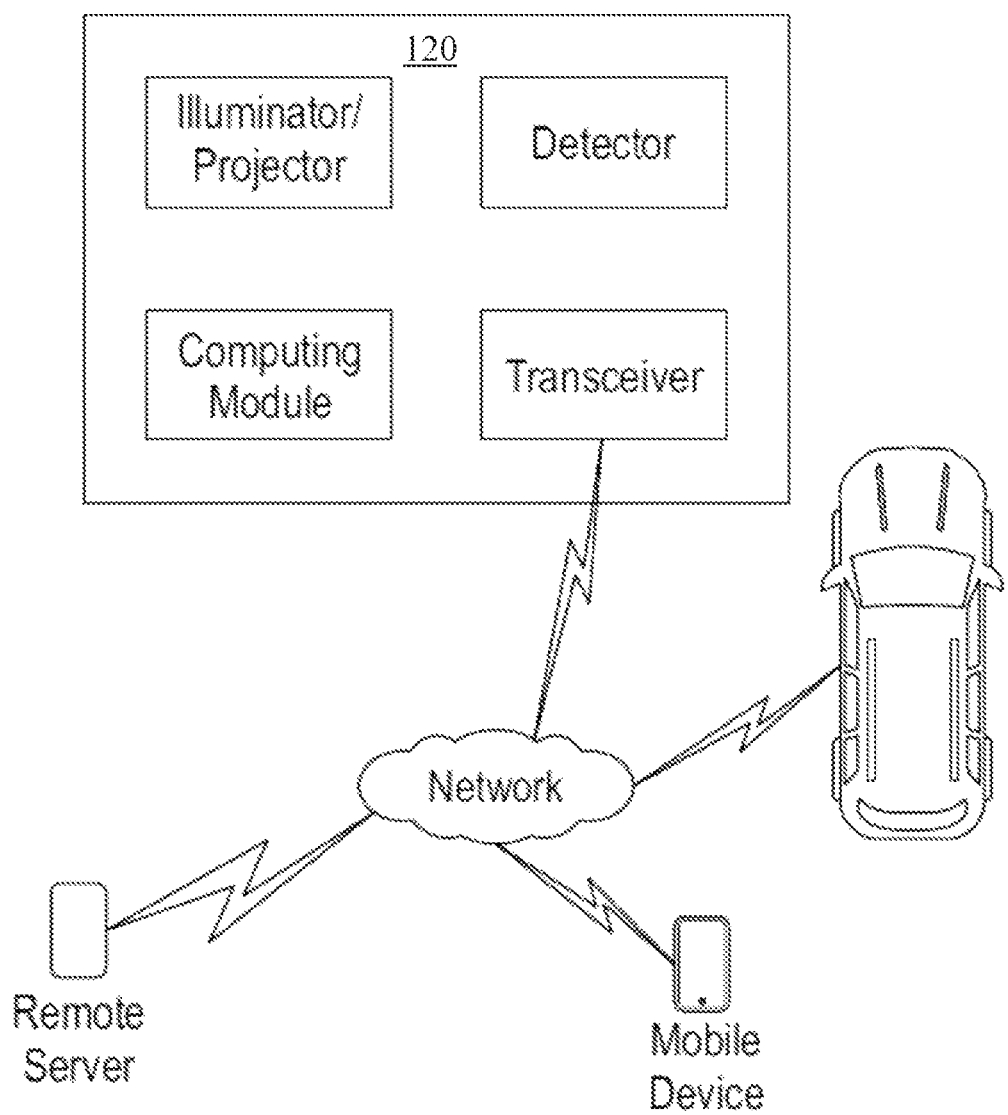
FIG. 7 is a block diagram of an example embodiment of a portable road lighting system as described herein, showing the system's optional interconnection to a mobile device and/or an automobile through a network.

As noted above with reference to FIG. 2, alternatively or in addition to a prelocated and fixedly mounted crosswalk illumination system, a portable system can be used. The illumination system can be carried by or worn on the pedestrian or a bicycle rider on mounted on the bicycle or other means of personal transportation such as skateboard, roller skates, or scooter. As shown schematically in FIG. 7, the portable device 120 can comprise a projector and/or illuminator, detector, computing module, and a transceiver.

The projector/illuminator can be laser or LED based and use reflectors, lenses, and mirrors. The detector can include one or more sensors to detect motion and/or distance and can be for example a gyroscope, an accelerometer, GPS receiver, camera, or microphone. The transceiver can connect to a network or Ethernet and receive and transmit information to a remote server, a mobile device, or vehicle for example. Weather, traffic, and/or road conditions can be transmitted to the portable device from the remote server.

Mobile devices such as mobile phones, PDAs or other like devices can transmit information about vehicles and other pedestrians to the portable device and visa-versa. Information can also be communicated directly from vehicles to the portable device of the pedestrian or bicycle rider and information about the pedestrian/bicycle rider can be transmitted back. The computing module can take the detector and transceiver inputs to generate appropriate illumination and/ or projection display images, text messages, and colors based on these inputs. The computer module can also send appropriate warnings via the transceiver to mobile devices, vehicles, and remote servers through the network or Ethernet. This system is particularly useful when street crossings are made by pedestrians at non-designated mid-street and intersections and pedestrians or bicycle riders walking or riding along a dimly lit or busy street.

The controller and processor can be integrated together in the same unit or module. Likewise, visible and IR light source can be integrated together in the same fixture or any optional supplemental radiation source such as ultrasonic, radar, VCSEL, LED array, or LiDAR can be integrated together in a fixture. It is also possible to integrate all electronics together in the light source, so that detector radiation, detector, processor, controller as well as visible light emitting elements are together in a module or fixture that may be termed as a smart light or smart lighting source.

As noted above the one or more light sources used in the systems described herein can provide a horizontal and vertical illuminance. In various embodiments the vertical illuminance can be less than the horizontal illuminance, the vertical illuminance can be equal the horizontal illuminance, and the vertical illuminance can be greater than the horizontal illuminance.

In general, it is desirable that the vertical illuminance be greater than the horizontal illuminance, so that the pedestrian is in positive contrast and background luminance is minimized, although the crosswalk is usually lit, so that its presence is visible. However some variations of the systems described herein have an optional projection that can work in conjunction with the spot lighting to provide a line or boundary, partial or full around a pedestrian and/or the projection can be in the image of a traffic sign or text message. These projections can be projected on the ground or pavement and can have a local horizontal illuminance that is much higher than the surrounding horizontal illuminance. In these embodiments with projections, the horizontal illuminance of the projection can be higher than the surrounding local horizontal illuminance and approach the vertical illuminance of the pedestrian, be equal to the vertical illuminance of the pedestrian, or be greater than the vertical illuminance of the pedestrian.

Preferably, the spatial zone of the projection does not significantly overlap with the spatial zone of the vertical illuminance of the pedestrian in the view of drivers of oncoming vehicles and cause a lowering of contrast of the pedestrian or the projected image. In one embodiment. The vertical illuminance is one-half or more the horizontal illuminance. In another embodiment, the vertical illuminance is at least equal to the horizontal illuminance. In yet another embodiment, the vertical illuminance is at least twice the horizontal illuminance. In another embodiment, the vertical illuminance is at least five times the horizontal illuminance.

In another embodiment, the horizontal illuminance of the projection is at least twice the horizontal illuminance of the surroundings. In another embodiment, the horizontal illuminance of the projection is at least five times the horizontal illuminance of the surroundings. In another embodiment, the horizontal illuminance of the projection can be about equal to the vertical illuminance of the pedestrian. In another embodiment, the horizontal illuminance of the projection can be greater than the vertical illuminance of the pedestrian. In another embodiment, the vertical illumination of the pedestrian has minimal overlap with the horizontal illuminance of the projection in oncoming vehicles drivers' view.

In an embodiment, the luminance of a pedestrian is at least twice the luminance of the background or local background (outside of a projection). In another embodiment, the luminance of a pedestrian is at least five times the luminance of the background. In yet another embodiment, the luminance of a pedestrian is at least ten times the luminance of the background.

In one embodiment, the vertical illuminance of a pedestrian is at least 10 lx. In another embodiment, the vertical illuminance of a pedestrian is at least 20 lx. In yet another embodiment, the vertical illuminance of a pedestrian is at least 30 lx. In still another embodiment, the vertical illuminance of a pedestrian is at least 50 lx. In still yet another embodiment, the vertical illuminance of a pedestrian is at least 100 lx.

The systems described herein may provide spot lighting or illumination of the pedestrian, where the vertical illumination of an object or pedestrian can be greater than the vertical illumination outside the spatial zone of this spot illumination. In an embodiment, the spot vertical illumination is at least 1.5 times the vertical illumination outside the spot. In another embodiment, the spot vertical illumination is at least twice the vertical illumination outside the spot. In yet another embodiment, the spot vertical illumination is at least five times the vertical illumination outside the spot. The horizontal illumination can also be dimmed or turned off around the pedestrian and this dark hole follow the pedestrian, so that the vertical illumination of the spot lighting and horizontal illumination of the optional projection can be viewed with increased contrast to a vehicle driver.

The power consumption for the road lighting systems described herein can be lower than conventional systems. For example, the spot lighting of individual pedestrians in a crossing can supply excellent vertical illuminance on the pedestrian for the entire length of the crossing, without having to supply this level and uniformity of vertical illumination throughout the entire length of the crossing because the spot follows the pedestrian(s).

In contrast, for conventional lighting systems, the power consumption does depend on the area of illumination. For a typical crosswalk 4 m wide with a conventional lighting system luminaire mounted 4 m ahead of oncoming traffic from the center of the crosswalk and 0.5 m away from the curb at a height of 5 m:150 W may be consumed for a single lane street 3.5 m long with a 13500 lm metal halide bulb, can have a vertical illumination average of 85 lx with a poor uniformity of 0.6 and 500 W may be consumed for a two lane street 7 m long using two 19000 lm bulbs, can have a vertical illumination average of 180 lx with a uniformity of 0.7.

The stationary lighting systems described herein can be turned off when pedestrians are not detected or can be dimly lit with a horizontal illuminance to make drivers aware of the crossing even though pedestrians are not present. When a pedestrian is detected, the horizontal illumination can increase, so that the crosswalk is sufficiently illuminated and increased vertical illumination is provided to make the pedestrian readily visible. The inventive crosswalk lighting system may use less than 300 W for a two lane crossing and less than 90 W for a single lane crossing. Furthermore, such a system may use less than 200 W for a two lane crossing and less than 60 W for a single lane crossing. For a portable lighting system of this invention power consumption may be less and may be less dependent on the length of the crossing since vertical illumination is provided from the portable device at a nearly fixed distance to the holder and if projections are also used, they can be of a fixed length for example 4 to 10 ft. long projections of a crosswalk.

Older designs for crosswalk lighting placed the Luminaires directly over the crosswalk. This provides high pavement illuminance $E_{horiz}$, but may not adequately light the pedestrian. Newer designs move the light source at least 2 m before the cross walk relative to the direction of oncoming traffic to provide the necessary vertical illuminance ($E_{vert}$) of the pedestrian. For computer modeling a pedestrian may be represented as a cylinder 5 feet 10 inches tall, 1 foot in diameter with a reflectance of 18%. Refitting or retrofitting the older designs that typically use high pressure sodium or metal halide lamps with a LED array and/or laser light sources described herein may provide greatly improved pedestrian visibility without having to relocate the infrastructure. The use of these lighting systems using LED arrays and/or laser light source, detector, optional emission for the detector, processor and controller may provide for greatly improved pedestrian lighting and safety and may save on power consumption. Improved safety and energy consumption is possible whether the installation is of a new design specifically for employing this technology, a retrofit of new or old convention design, or a portable system.

As noted above, the illumination and/or projection devices used in the systems, devices, and methods described herein may be or include an LED array or laser. Some aspects of such LED arrays are further described next, with reference to FIG. 8A-FIG. 12.

Figure 8A:
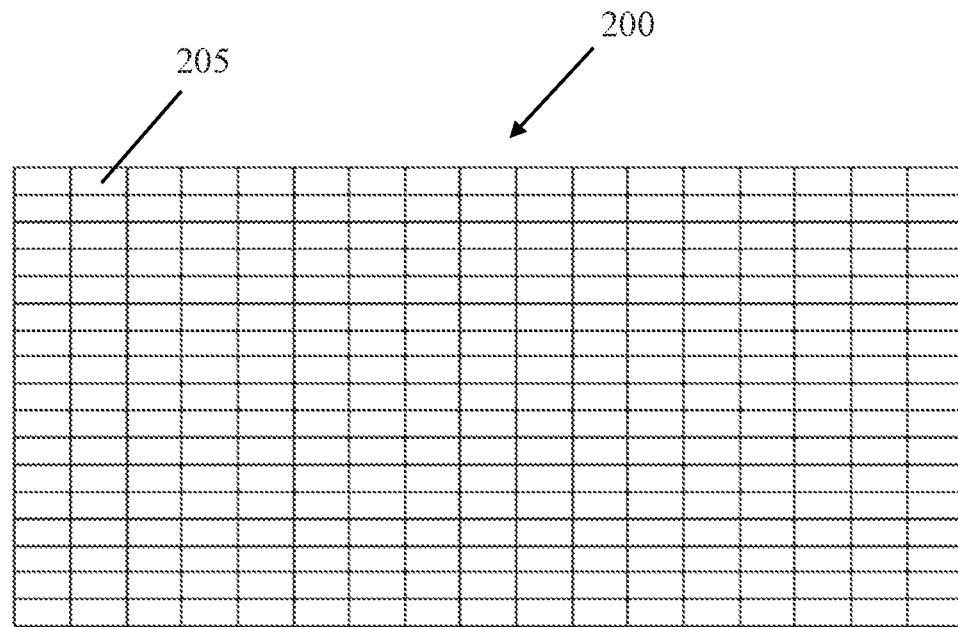
FIG. 8A and FIG. 8B, respectively, show plan and schematic views of an example M×N matrix pixelated microLED that may be used in light sources in a road lighting system as described herein.
Figure 8B:
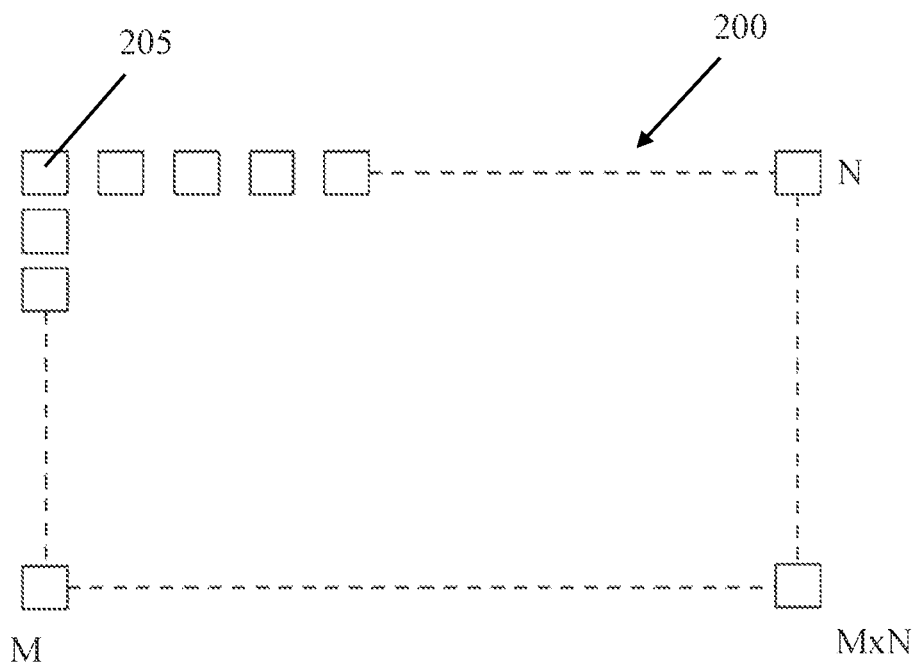

FIGS. 8A and 8B show plan and schematic views of an example M×N matrix pixelated microLED 200, comprising M×N pixels 205. The number of individual pixels in the array can be, for example, 2 to 10 and can be used in a mobile phone flash and the like, 10 to 50 in some embodiments, 50 to 100 in some embodiments, 100 to 500 in other embodiments, 500 to 1000 in other embodiments, 1000 to 2500 in yet other embodiments, 2500 to 5000 in yet other embodiments, 5000 to 10000 in still yet other embodiments, these can be used for instance in adaptive vehicle headlights, adaptive street lights, adaptive crosswalk illumination and the like. Still other embodiments include 10000 to 100000 and 100000 to 500000 that can use LED or laser light sources, 500000 to 1000000, and 1000000 to 100000000 that can use laser light source or sources such as a raster scanned laser(s) may be used. Raster scanning may be accomplished with a microelectromechanical system (MEMS) based mirror or with an acousto-optic reflector or deflector. These embodiments can be suitable for displays.

Figure 9A:
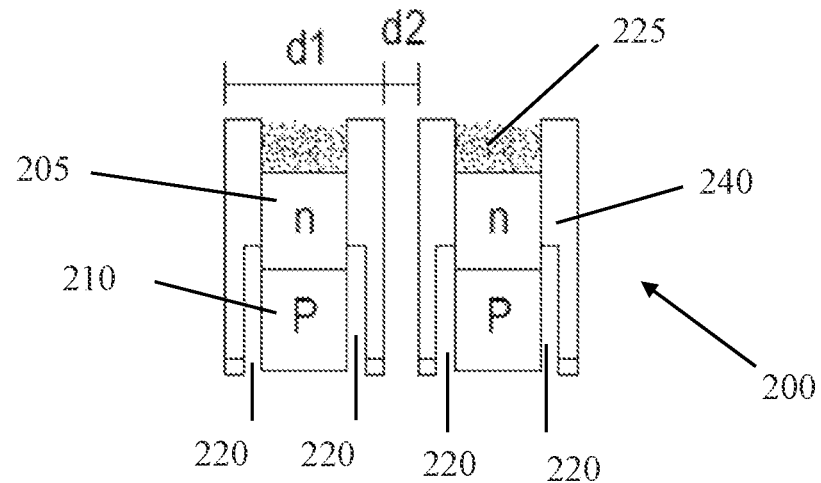
FIG. 9A shows a schematic partial cross-sectional view of a portion of an example M×N matrix pixelated microLED that may be used in light sources in a road lighting system as described herein.

FIG. 9A shows a partial cross sectional view of one embodiment of an LED matrix array 200. The n (205) and p-type (210) semiconductor layers sandwich an active region that emits light. The n and p-type semiconductor layers and the active region may themselves contain multiple layers of different doping levels and compositions. For example the active region may be a single light emitting layer, a homojunction, a single heterojunction, a double heterojunction or heterostructure, a single quantum well heterostructure (SQW), a multiple quantum well (MQW) structure, or a superlattice (SL) structure. The n and p-type semiconductor layers may be for example GaN or AlGaN and the active region may be InGaN and GaN. Other semiconductor material systems include AlGaInP, AlGaAs, and AlGaInAsP for example. Once the epitaxial layers are grown, trenches can be etched through the p-layers and into the thicker n-layer.

The p-n junction can be passivated with a dielectric, such as $SiO_x$, $AlO_x$, SiON, SiAlON, $TaO_x$, $AlO_x$, or $Si_3N_4$ or the like to prevent shorting or may be isolated by ion implantation, such as hydrogen, carbon, and oxygen ions for example. In the example of FIG. 9A, such dielectric may be deposited on surfaces of the n and p layers in regions 220. Metal contacting the n-layer and the dielectric can extend to the p-layer side. P-metal may be deposited before or after the trench etch.

In one embodiment, metal contacts 240 to n-type material can extend to the p-side surface with isolation from the p-type material. The p-type and n-type metal electrodes may then be on the same side and can be bonded to a silicon wafer that may contain electronics such as a switching transistor, TVS, open and/or short detection and the like. Bonding can include soldering, such as AuSn or SnAgCu (SAC) solders, or a GGI bond using thermal and ultrasonic energy to form an Au bond interconnect.

The metal may be extended by plating for example past the n-layer after the growth substrate, for example sapphire, is removed. The n-metal can serve as the seed for plating and may be exposed by growth substrate removal, if the p-side trench and metallization extends completely through the n-layer to the substrate, by thinning the n-layer, or a subsequent trench etch from the n-side after substrate removal. The p and n-metal contacts are preferably reflective and may be for example Ag, Al, Ni, Ti, TiW, TiWN, Au, Zn and combinations and layers thereof. The extensions beyond the n-surface can be a reflective metal as described above or a TCO, such as ITO, ISO, AZO, IZO or a dielectric, such as sapphire, photoresist, $SiO_x$, SiON, SiAlON, $TaO_x$, $AlO_x$, or $Si_3N_4$ that may be reflective by TIR or a metallic coating.

Figure 9B:
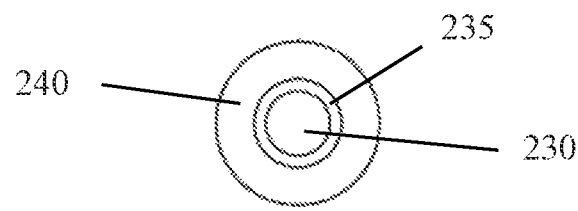
FIGS. 9B and 9C show schematic plan views of example arrangements of n and p electrodes in the example microLED.
Figure 9C:
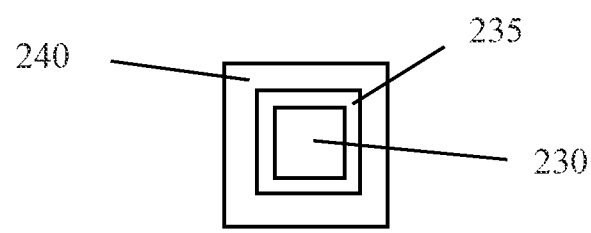
Figure 10A:
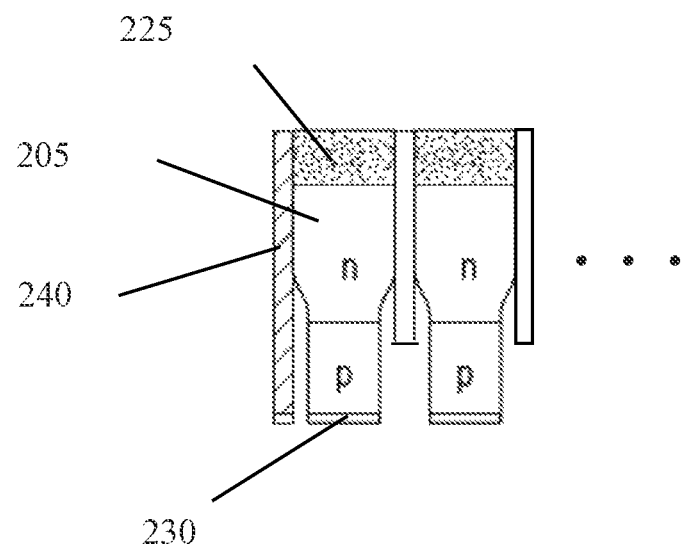
FIG. 10A and FIG. 10B each show schematic partial cross-sectional views of portions of other example M×N matrix pixelated microLED that may be used in light sources in a road lighting system as described herein.
Figure 10B:
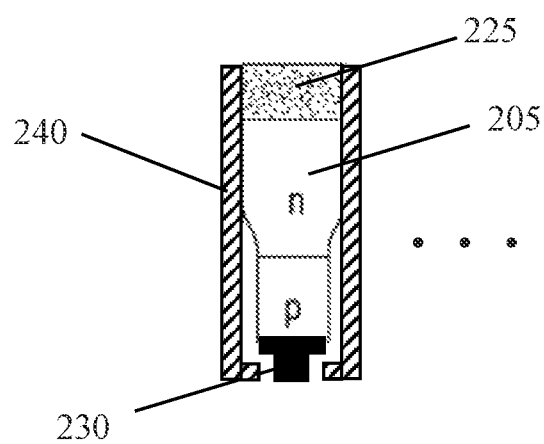
Figure 11:
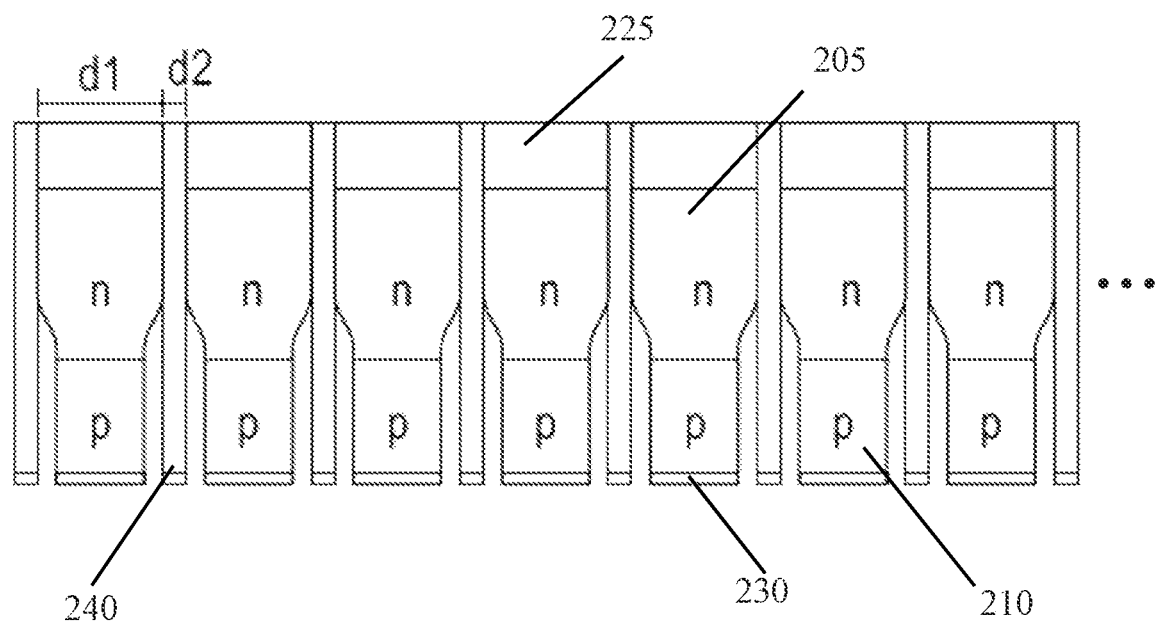
FIG. 11 shows a schematic partial cross-sectional view of a portion of another example M×N matrix pixelated microLED that may be used in light sources in a road lighting system as described herein.
Figure 12:
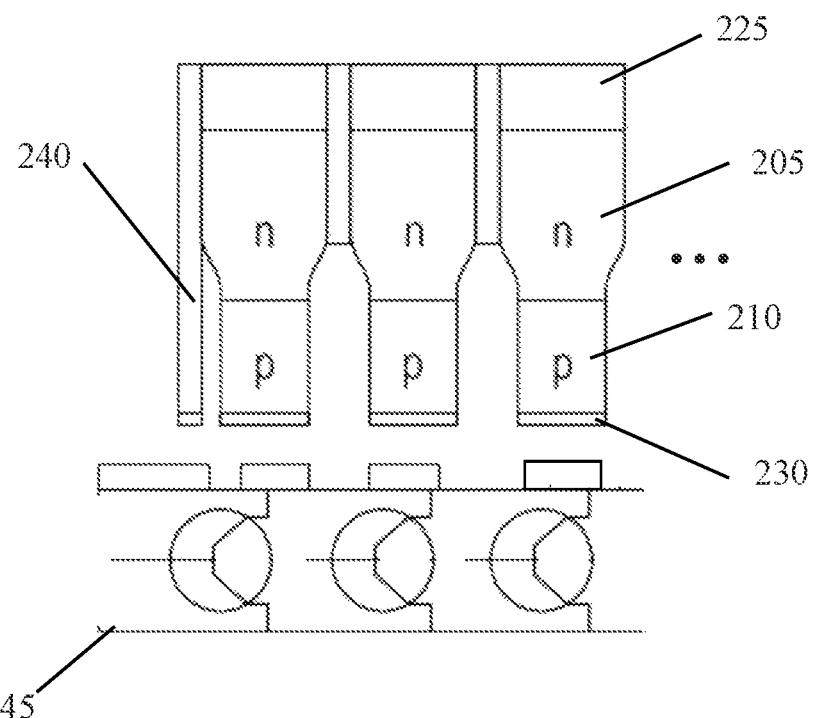
FIG. 12 shows a schematic partial cross-sectional view of a portion of another example M×N matrix pixelated microLED that may be used in light sources in a road lighting system as described herein, in combination with a schematic partial cross-sectional view of a portion of a CMOS silicon back plane that may be used to switch pixels in the array on and off.

The extensions may be used to hold or contain a wavelength converter 225, such as phosphor in silicone or other suitable binder or a ceramic phosphor. Phosphor may be applied by dispensing, ink-like jet printing, sedimentation, EPD, stenciling, spraying or molding. The pixel may be for example square, round, oval, or rectangular in shape. FIG. 9B and FIG. 9C show that the p-electrode 230 can be square, rectangular, circular, or oval in shape surrounded by a thin dielectric 235 and the n-electrode 240 around the perimeter. The n-electrode may completely surround (FIG. 9A and FIG. 11), partially surround (FIG. 10A), or be to one side of the p-electrode (FIG. 12). The n-electrode may also overlap the p-electrode separated by a dielectric (FIG. 10B).

The electrodes may be connected in the device or by the Si backplane 245 (schematically shown for example in FIG. 12) in a common cathode or anode configuration. The n and p-layer and electrode positions are shown in the figures for convenience, but their positions can also be swapped that is opposite from what is shown.

Multiple matrix arrays may be used in an illumination device and these multiple arrays may be spaced apart from one another and do not have to be adjacent in an extended matrix configuration. For instance, one matrix in a crosswalk illumination system may provide for crosswalk illumination and another matrix is used to provide spot lighting that follows the pedestrians as they cross the street.

Pixel size d1 (FIG. 9A and FIG. 11) may be for example from submicron to 1 micron, 1 micron to 10 microns, 10 microns to 50 microns, and 50 microns to 500 microns in various embodiments. Pixel spacing d2 may be determined by width of the metal layer (FIG. 11) or may include an actual gap (FIG. 9A). Pixel spacing d2 may be for example less than 0.1 micron, 0.1 to 1 micron, 1 micron to 5 microns, and 5 to 50 microns embodiments. Pixel spacing d2 may depend on pixel size d1.

Pixels may be in any shape or combination of shapes, for example circular, square, rectangular, triangular, hexagonal and combinations thereof. Phosphor particle sizes may depend on pixel size d1 and may be at least d1/10 or smaller in size. The luminous flux of these arrays can be $10^{-4}$ to $10^{-3}$ lumens (lm), $10^{-3}$ to 0.1 lm, 0.1 to 10 lm, 10 to 1000 lm, 1000 to 10000 lm, 10000 to 100000 lm, and 0.1 to $5\times10^6$ lm in some embodiments. The luminance of these arrays can be 10 to 100 lux (lx), 100 to 500 lx, 500 to 1000 lx, 1000 to 50000 lx, 50000 to 500000 lx, $0.5\times10^6$ to $1\times10^6$ lx, $1\times10^6$ to $10\times10^6$ lx, and $10\times10^6$ to $5000\times10^6$ lx in some embodiments. The illuminance of these arrays may be 10 to 100 nit, 100 to 1000 nit, 1000 to 10000 nit, 10000 to 100000 nit, $0.1\times10^6$ to $1\times10^6$ nit, $1\times10^6$ to $1000\times10^6$ nit in some embodiments. The luminance and illuminance of these arrays can be measured without external optics and can include laser as well as LED arrays. Luminous efficacy can be 1 to 20 lm/W, 20 to 200 lm/W, and 200 to 500 lm/W in some embodiments. These arrays may be packaged with primary optics, such as lenslet arrays or compound parabolic concentrators (CPC) and may include secondary optics such as a projection lens.

This disclosure is illustrative and not limiting. Further modifications will be apparent to one skilled in the art in light of this disclosure and are intended to fall within the scope of the appended claims.

The following enumerated paragraphs (clauses) provide additional non-limiting examples of the disclosure.

1. A lighting system comprising: a light source; a detector; a processor; and a controller; wherein the system is configured so that light from the light source illuminates a portion of road surface and provides spot illumination to moving objects on the road surface, such that the spot illumination follows the moving object along the portion of the road surface.

2. The lighting system of clause 1, wherein the lighting system is stationary and provides lighting for a pedestrian street crossing.

3. The lighting system of clause 1, wherein the lighting system is portable and provides lighting for one of a pedestrian and a pedestrian using personal transport.

4. The lighting system of clause 3, wherein the personal transport is one of bicycle, scooter, Segway and skates.

5. The lighting system of clause 1, wherein the light source comprises one of a LED and laser.

6. The lighting system of clause 1, wherein the light source comprises a LED array.

7. The lighting system of clause 1, wherein the light source comprises a microLED array.

8. The lighting system of clause 1, wherein the light source comprises a laser and wavelength converter.

9. The lighting system of clause 1, wherein the system is further configured to provide a spot of reduced horizontal illuminance that follows the moving object along the portion of the road surface for increased contrast.

10. The lighting system of clause 1, wherein the system further comprises a projection at least partially surrounding and following a pedestrian.

11. The lighting system of clause 10, wherein the projection is one of circular, oval, square, and rectangular.

12. The lighting system of clause 11, wherein the projection further comprises an arrow that indicates the direction of the pedestrian.

13. The lighting system of clause 1, wherein the system further comprises a projection of one of a traffic sign and text message visible to a vehicle driver.

14. The lighting system of clause 1, wherein the system further provides a projection that comprises one or more color.

15. The lighting system of clause 7, wherein the microLED array comprises LED chips, mounted and electrically connected to CMOS circuitry on a silicon wafer, wherein the LED chips are separated by a dielectric and metal that extends above a semiconductor surface of the LED chip and is filled with a wavelength converter.

16. The lighting system of clause 1, wherein the system comprises a vertical illuminance that is at least twice the horizontal illuminance.

17. The lighting system of clause 1, wherein the system comprises a vertical illuminance that is at least five times the horizontal illuminance.

18. The lighting system of clause 10, wherein the horizontal illuminance of the projection is at least twice the horizontal illuminance of the surrounding pavement.

19. The lighting system of clause 10, wherein the horizontal illuminance of the projection is at least equal to the vertical illuminance of the pedestrian.

20. The lighting system of clause 10, wherein the horizontal illuminance of the projection is less than the vertical illuminance of the pedestrian.

21. The lighting system of clause 1, wherein the system further comprises a transceiver capable of communication with a network.

22. The lighting system of clause 21, wherein the system further comprises a transceiver capable of communication with at least one of a vehicle, a mobile phone, and a remote server over the network.

23. The lighting system of clause 1, wherein the lighting system comprises a non-motor vehicle lighting system.

24. A portable illumination device comprising: a light source; a detector; a computer; and a transceiver; wherein, the light illuminates a holder and projects an image on the ground.

25. The portable illumination device of clause 24, wherein the light source comprises one of a LED and laser.

26. The portable illumination device of clause 24, wherein the detector is one of an accelerometer, gyroscope, and GPS.

27. The portable illumination device of clause 24, wherein the transceiver can communicate with at least one of a vehicle, a mobile phone, and a remote server over a network.

28. The portable illumination device of clause 24, wherein the image at least partially surrounds and follows the holder.

29. The portable illumination device of clause 24, wherein the image further comprises an arrow that indicates the direction of the holder.

30. The portable illumination device of clause 24, wherein the image comprises one of a traffic sign and text message visible to a vehicle driver.

31. The portable illumination device of clause 24, wherein the image comprises one or more color.

32. The portable illumination device of clause 24, wherein the holder is one of a pedestrian and a pedestrian on a personal transport.

33. The portable illumination device of clause 32, wherein the personal transport is one of a bicycle, scooter, Segway and skates.

34. The portable illumination device of clause 24, wherein the holder is one of a bicycle, scooter, Segway and skate.

35. The portable illumination device of clause 24, wherein the holder comprises a non-motor vehicle.

What is claimed is:

1. A road lighting system deployed on or near a roadway, the road lighting system comprising:
   one or more light sources comprising a microLED array, the microLED array comprising a plurality of pixels each 500 microns or less in size and arranged in a matrix, a spacing between adjacent pixels being 50 microns or less, the pixels mounted on and electrically connected to CMOS circuitry;
   one or more detectors arranged to detect an object or person on or near the roadway and arranged to detect disability glare;
   a processor configured to receive and process signals from the one or more detectors; and
   a controller configured to receive signals from the processor and in response control the one or more light sources to illuminate a portion of the road surface and to provide spot illumination to the object or person on or near the roadway that provides increased visual contrast of the object or person against the roadway.

2. The road lighting system of claim 1, wherein:
   the one or more detectors are arranged to detect a motor vehicle on the roadway approaching the object or person; and
   the controller is configured to control illumination of the object or person so that a vertical illuminance component of the spot illumination on the object or person is visible from the motor vehicle.

3. The road lighting system of claim 1, wherein the controller is configured to receive signals from the processor and in response control pixels in the microLED array in the light source to provide the spot illumination to the object or person that tracks the object or person as the object or person moves on or near the roadway.

4. The road lighting system of claim 1, wherein the controller is configured to receive signals from the processor and in response control the pixels in the microLED array to provide spot illumination comprising a projection that tracks and at least partially surrounds the object or person as the object or person moves on or near the roadway.

5. The road lighting system of claim 1, wherein the CMOS circuitry is arranged to switch individual ones of the pixels on and off.

6. The road lighting system of claim 4, wherein the one or more light sources comprise an infrared (IR) light source.

7. The road lighting system of claim 6, wherein the IR light source comprises a VCSEL array.

8. The road lighting system of claim 1, wherein the microLED array has a luminance of 10 to 100 lux (lx).

9. The road lighting system of claim 8, wherein the controller is configured to receive signals from the processor and in response control pixels in the microLED array to provide spot illumination on the object or person comprising vertical illuminance from 10 to 100 lx.

10. The road lighting system of claim 9, wherein the spot illumination on the object person comprises horizontal illuminance, the vertical illuminance being different from the horizontal illuminance.

11. A road lighting system deployed on or near a roadway, the road lighting system comprising:
   one or more light sources comprising a first LED array and configured to emit visible light;
   one or more infrared (IR) light sources comprising a VCSEL or a second LED array and configured to emit IR light;
   one or more cameras configured to operate in the (IR) range and arranged to detect an object or person on or near the roadway with the IR light emitted from the one or more IR light sources;
   a processor configured to receive and process signals from the one or more cameras and configured to communicate with the one or more IR light sources; and
   a controller configured to receive signals from the processor and in response control the one or more light sources to provide spot illumination to the object or person on or near the roadway that provides increased visual contrast of the object or person against the roadway.

12. The road lighting system of claim 1, wherein:
   the one or more detectors are arranged to detect disability glare by at least one of detecting oncoming traffic and reflectivity of the roadway.

13. The road lighting system of claim 12, wherein the controller is configured to receive signals from the processor and in response control the one or more light sources to mitigate disability glare.

14. The road lighting system of claim 13, wherein the controller is configured to control the one or more light sources to mitigate disability glare by controlling the one or more light sources to produce asymmetric light output such that light is directed onto the side of the object or person facing oncoming traffic.

15. The road lighting system of claim 11, wherein the one or more light sources comprises an IR light source and the one or more detectors comprises a camera configured to operate in the IR range, the camera arranged to detect the object or person on the roadway by use of the IR light source.

16. The road lighting system of claim 11, wherein the one or more detectors comprises a pressure sensitive pad.

17. The road lighting system of claim 11, wherein the one or more detectors comprises a camera comprising:
   a charge-coupled device (CCD);
   a digital signal processor (DSP) comprising an analog digital converter (ADC) and configured to communicated with the processor.

18. A road lighting system deployed on or near a crosswalk on a roadway, the road lighting system comprising:
   a first light source comprising an LED array disposed above or adjacent to a first side of the crosswalk facing or opposite to oncoming vehicular traffic;
   a second light source disposed above or adjacent to a second side of the crosswalk perpendicular to the first side;
   one or more detectors arranged to detect a pedestrian on or near the crosswalk;
   a processor configured to receive and process signals from the one or more detectors; and
   a controller configured to receive signals from the processor and in response control the first and second light sources to illuminate a portion of the crosswalk and/or to provide spot illumination to the object or person, the first and second light sources controlled to provide different horizontal illuminance components and vertical illuminance components from each other, the horizontal illuminance components in a plane parallel to the roadway and the vertical illuminance components in a plane perpendicular to the roadway.

19. The road lighting system of claim 18, wherein at least one of the processor and the controller is connected to the network or the Ethernet and is configured to communicate to the object or person, or an oncoming vehicle, a visual and/or audible warning.

20. The road lighting system of claim 18, wherein at least one of the processor and the controller is connected to the network or the Ethernet and is configured to receive a communication from a mobile phone or other communication device and in response control the one or more light sources to illuminate the object or person.

* * * * *